United States Patent
Kumamura et al.

[11] Patent Number: 5,092,753
[45] Date of Patent: Mar. 3, 1992

[54] ELECTRIC INJECTION MOLDING APPARATUS

[75] Inventors: Masaaki Kumamura, Yokohama; Ryohei Inaba, Kawasaki; Shojiro Danmoto, Ushiku; Mitsuo Arai, Chichibu; Yozo Tobo, Yokohama; Tadanobu Miyazaki, Ushiku, all of Japan

[73] Assignee: Canon Kabushiki Kaisha, Tokyo, Japan

[21] Appl. No.: 514,731

[22] Filed: Apr. 26, 1990

[30] Foreign Application Priority Data

Apr. 26, 1989 [JP] Japan ................................. 1-104516
Apr. 26, 1989 [JP] Japan ................................. 1-104517
Apr. 26, 1989 [JP] Japan ................................. 1-104518

[51] Int. Cl.$^5$ ............................................. B29C 45/77
[52] U.S. Cl. .................................. 425/145; 264/40.4; 425/169; 425/171
[58] Field of Search ............... 425/135, 145, 147, 169, 425/171, 542; 264/40.3, 40.4, 40.5

[56] References Cited

U.S. PATENT DOCUMENTS 4,540,359 9/1985 Yamazaki ............................ 425/135

FOREIGN PATENT DOCUMENTS 224324 12/1984 Japan .................................. 425/145
61-57168 12/1986 Japan .

Primary Examiner—Timothy Heitbrink
Attorney, Agent, or Firm—Fitzpatrick, Cella, Harper & Scinto

[57] ABSTRACT

An injection screw disposed in a heating cylinder is connected to a rotary driving force receiving mechanism, a linear driving force receiving mechanism, and a back pressurizing mechanism. The rotary driving force of an electric motor is transmitted to the rotary driving force receiving mechanism and the linear driving force receiving mechanism through clutches, which are controlled according to sensors for detecting the position of the screw or the linear driving force receiving mechanism.

2 Claims, 7 Drawing Sheets

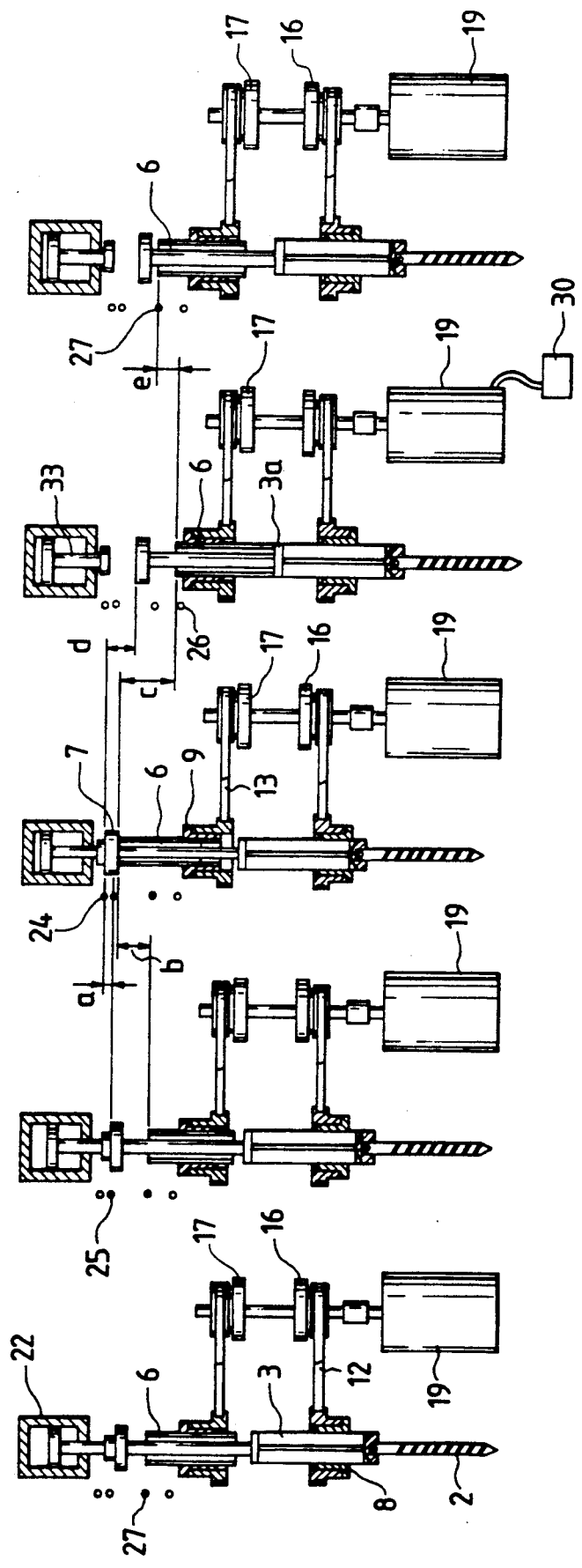

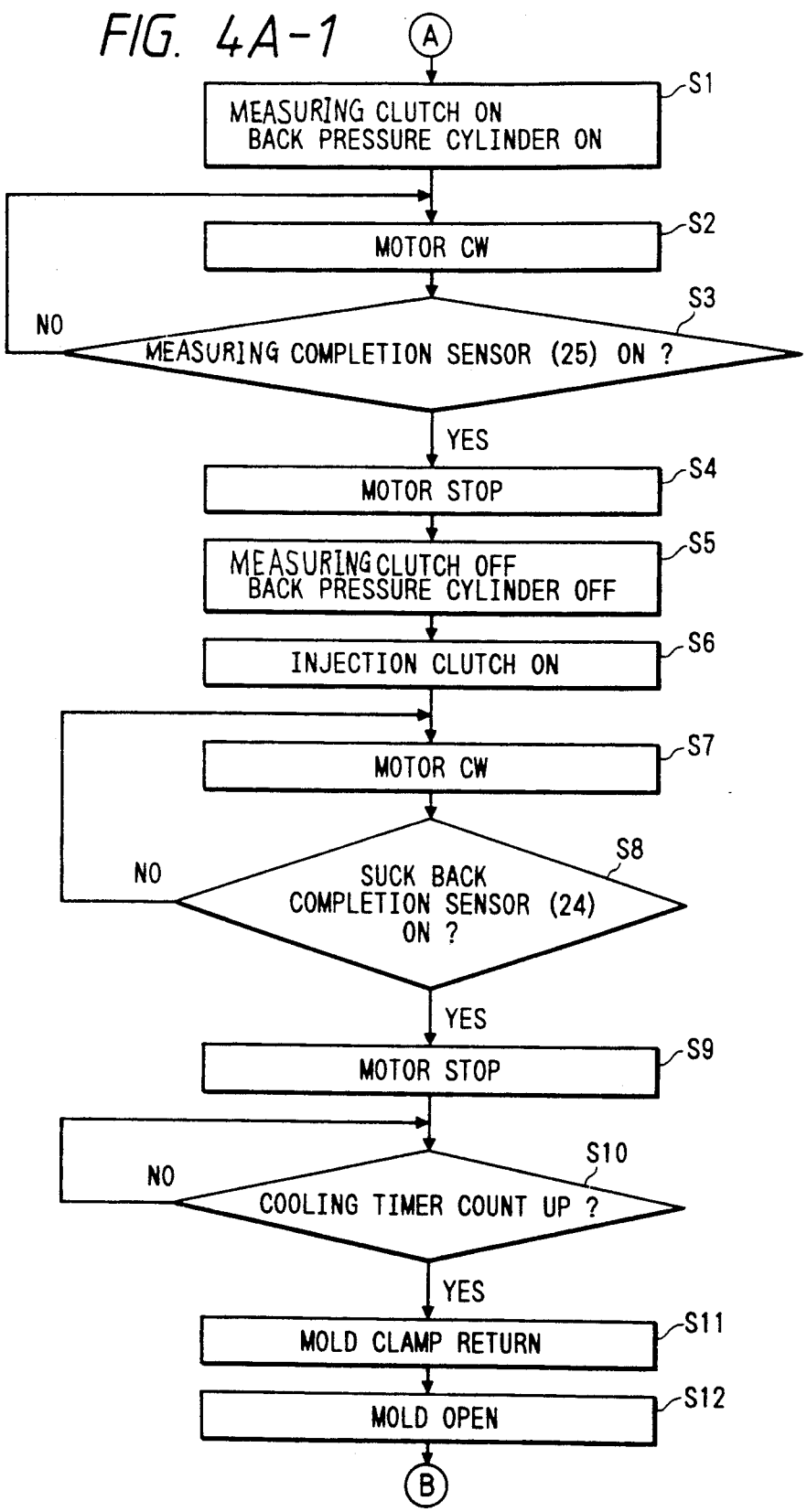

ELECTRIC INJECTION MOLDING APPARATUS

BACKGROUND OF THE INVENTION

1. Field of the Invention

The present invention relates to a method of control, for use in an injection molding apparatus utilizing a motor, particularly an injection molding apparatus in which linear motion and rotary motion of a screw is conducted by a motor, for controlling the switching of a transmission of the driving force of said motor according to a detection signal from a sensor.

2. Related Background Art

In the injection molding method for producing molded articles by injecting a molding material such as plastics into a mold, there have principally been employed hydraulic and electric injection molding apparatus.

In the following there will be explained a conventional hydraulic injection molding apparatus with reference to FIG. 5. Said apparatus is principally composed of a hopper 71; a screw 73 for blending and measuring the resin, supplied from said hopper 71, in a cylinder 72; a motor 51 for rotating said screw 73; and straight-moving cylinder 52 for injecting thus blended resin. The motor 51 and straight-moving cylinder 52 are usually hydraulic for the ease of obtaining a high output. Then, in the following there will be explained an electric injection molding apparatus disclosed in the Japanese Patent Publication Sho 61-57168, shown in FIG. 6. A screw 53 housed in a heating cylinder 66 is fixed to a screw rotating gear 54 positioned in the back. A support member 56, slidably supported by a guide bar 57, rotatably supports said screw rotating gear 54 and is provided, at the front end thereof, with a ball nut 55 in which is fitted a ball bearing screw 58 maintained in contact with the shaft of the gear 54. On said ball bearing screw 58 there is fixed a rotating gear 59. Said screw rotating gear 54 and said rotating gear 59 mesh respectively with driving gears 63, 64 provided on the rotary shaft of a motor 62 and connected respectively thereto by clutches 60, 61.

Behind said rotating gear 59, there is provided a back pressing brake unit 65 for receiving the retracting movement of the screw 53 from behind the gear 59. When the screw 53 is retracted by the blending and measuring of the resin from the hopper 74 into the heating cylinder 66, the ball nut 55 is retracted through the gear 54 and the support member 56 to rotate the ball bearing screw 58, whereby the gear 59 is rotated. By pressing the end face of said rotating gear 59 with the brake unit 65, the rotation of said gear 59 can be controlled by the slip torque therebetween, and back pressing to the screw 53 can be achieved in this manner.

However the conventional injection molding apparatus explained above have been associated with various drawbacks as will be explained in the following.

In the hydraulic injection molding apparatus as shown in FIG. 5;

(1) A large space is required for installation, because of peripheral equipment such as hydraulic pump and pipings; and
(2) It is difficult to operate the molding apparatus in a clean condition, because of oil mists etc. generated by the hydraulically driven equipment.

On the other hand, the electric injection molding apparatus as shown in FIG. 6 is no longer associated with the above-mentioned drawbacks, but is still associated with following drawbacks:

(1) Since the back pressure has to be controlled by the sum of a force for converting the linear motion for example of the ball nut at the screw retraction into a rotary motion for example of the ball bearing screw, and a force generated by the slip torque of a plate pressing the end face of the gear, there are required complex settings of multiple parameters such as rotary resistance for example of ball bearing screw, frictional force of the braking plate, output generated by the brake etc.; and
(2) Since the rotated gear and the propelled ball nut are supported by the same support member and are constructed to integrally move with the screw, there is required a guide member for stopping the rotation of the support member, whereby a large space is required around the driving system, and the structure becomes inevitably complicated.

In consideration of the foregoing, the present inventors have designed an electric injection molding apparatus for effecting the rotary motion and linear motion of a screw housed in a heating cylinder by means of an electric motor, comprising a rotating mechanism, a linear moving mechanism and a back pressurizing mechanism behind said screw in the above-mentioned order or in an order of the linear moving mechanism, rotating mechanism and back pressurizing mechanism, wherein said rotating mechanism comprises a rotary shaft for rotating said screw and a first rotary driving force transmission mechanism for transmitting the rotary driving force of said motor to said rotary shaft; said linear moving mechanism comprises a guide shaft having stopping portions at the ends thereof, a hollow ball bearing screw slidably fitted on said guide shaft and stopped by said stopping portions, a ball nut engaging with said hollow ball bearing screw, and a second rotary driving force transmitting mechanism for transmitting the rotary driving force of said motor to said ball nut; and said back pressurizing mechanism comprises a back pressure cylinder, and a cylinder rod for pressing said guide shaft or said rotary shaft.

Such apparatus allows control of the back pressure with a simple mechanism which is easily adjustable, and also allows compactization of the screw propelling and rotating mechanisms.

In such electric injection molding apparatus, by feeding the molding material such as resin into the heating cylinder under the rotation of the screw, the material is blended in the cylinder while the screw is retracted, whereby the blended material is accumulated in front of the screw.

SUMMARY OF THE INVENTION

An object of the present invention is to provide a device, for use in an injection molding apparatus provided with clutch means, between a screw for injecting molten molding material into the mold and a cylinder for providing the screw with a back pressure, for transmitting rotary motion to said screw for measuring and blending of the molding material and linear motion to said screw for providing said screw with an injecting force, enabling exact clutch switching operation.

Another object of the present invention is to provide a method, for use in an electric injection molding apparatus provided with means for switching the transmission of the driving force of a motor either to screw rotary driving force receiving means or screw linear driving force receiving means, for detecting the completion of measurement of the molding material by means of a sensor and controlling the function of said switching means according to a signal from said sensor.

Still another object of the present invention is to provide a method, in the suction operation of the injection molding apparatus for preventing the leakage of the molding material present in front of the screw of the heating cylinder from the injecting outlet at the mold opening after the measurement of said material, enabling easy and precise adjustment of suction after the blending and measurement.

Still another object of the present invention is to provide a screw driving mechanism capable of driving a screw and providing the back pressure with a simple mechanism, and allowing easy adjustment of these functions, adapted for use in the electric injection molding apparatus of a conventional structure as shown in FIG. 5, which has required a large space around the driving system and has been associated with a complicated structure, because a guide member for stopping rotation is required for the supporting member, supporting the rotated gear and propelled ball nut and moving with the screw.

The above-mentioned objects can be attained, according to the present invention, by a screw driving mechanism, for use in an electric injection molding apparatus in which the rotary motion and linear motion of a screw housed in a heating cylinder are conducted by an electric motor, wherein a spline shaft and a guide shaft are connected in succession behind said screw, a hollow ball bearing screw is slidably but non-rotatably fitted on said guide shaft between stop portions at the ends thereof and is screwed on a ball nut rotated by said motor, and a linear driving means for the screw is provided behind said guide shaft.

BRIEF DESCRIPTION OF THE DRAWINGS

FIG. 1A is a schematic view of an electric injection molding apparatus embodying an embodiment of the measuring method of the present invention;

FIG. 1B is a cross-sectional view along a line II—II in FIG. 1A;

FIG. 1C is a cross-sectional view along a line III—III in FIG. 1A;

FIGS. 3A to 3E, 4A, 4A-1, 4A-2 and 4B are schematic views, flow charts, and block diagrams showing the function of the above-mentioned embodiment;

DETAILED DESCRIPTION OF THE PREFERRED EMBODIMENTS

Now the present invention will be clarified in detail by an embodiment thereof shown in the attached drawings.

Figure 1:
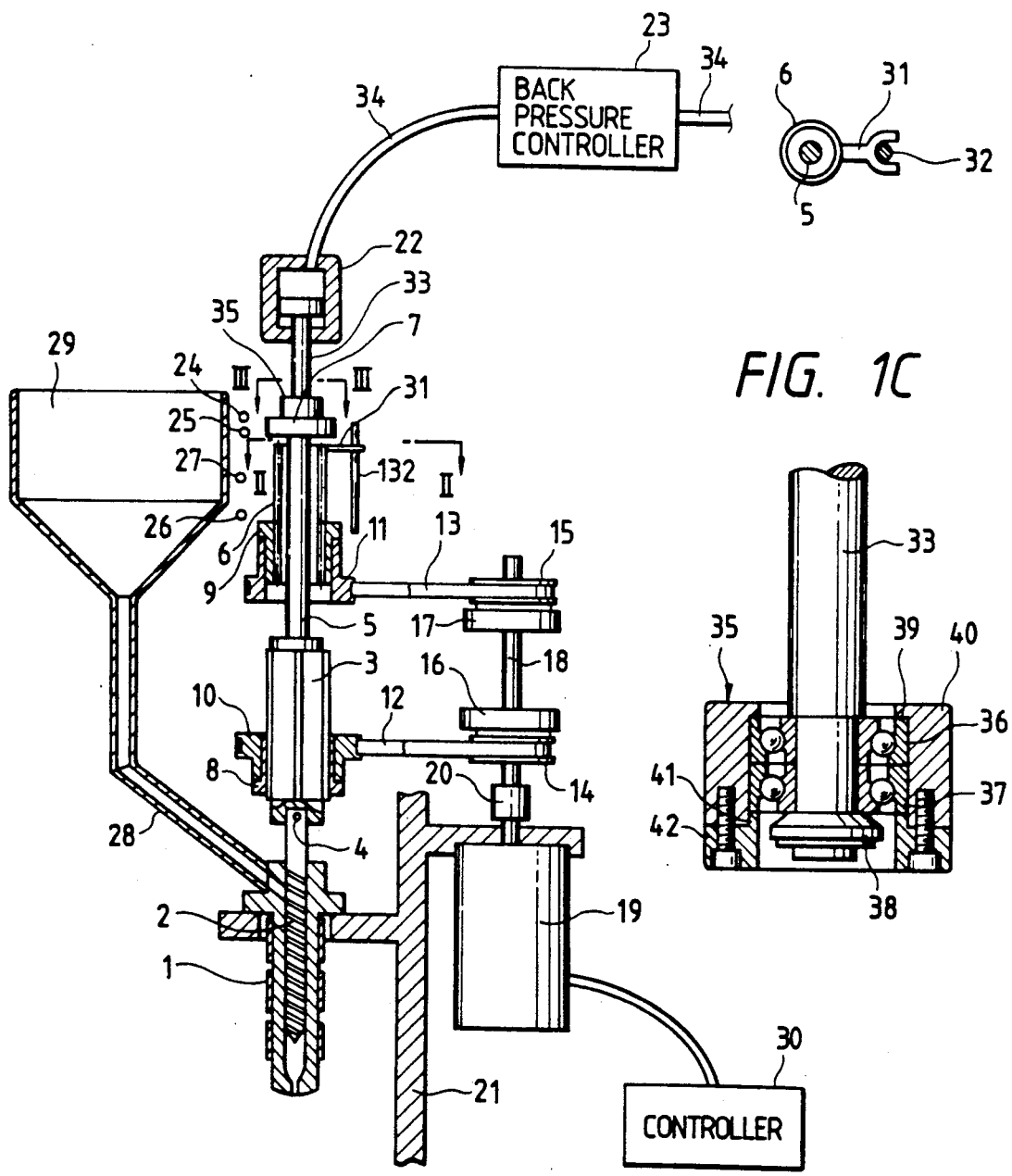
Figure 2:
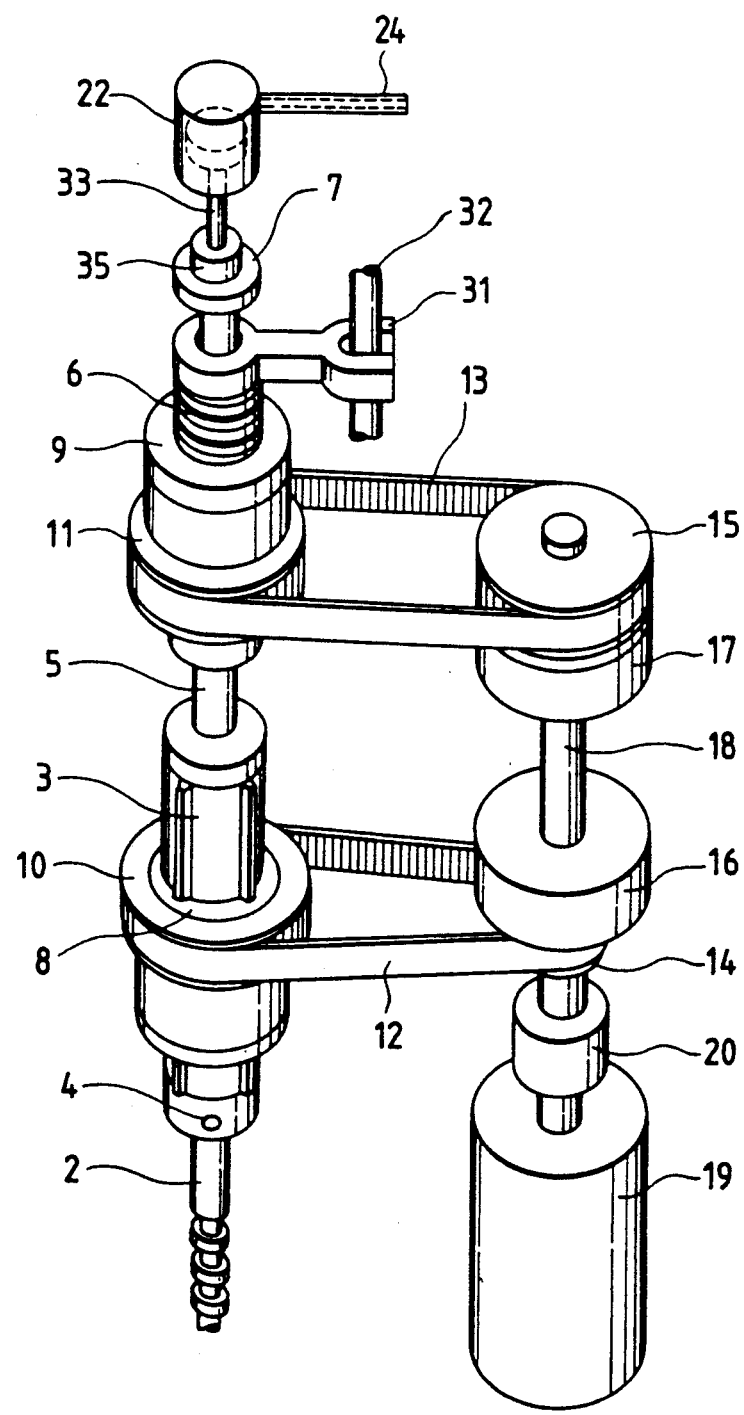
FIG. 2 is a perspective view of a part of the electric injection molding apparatus shown in FIG. 1.
Figures 2, 4A:
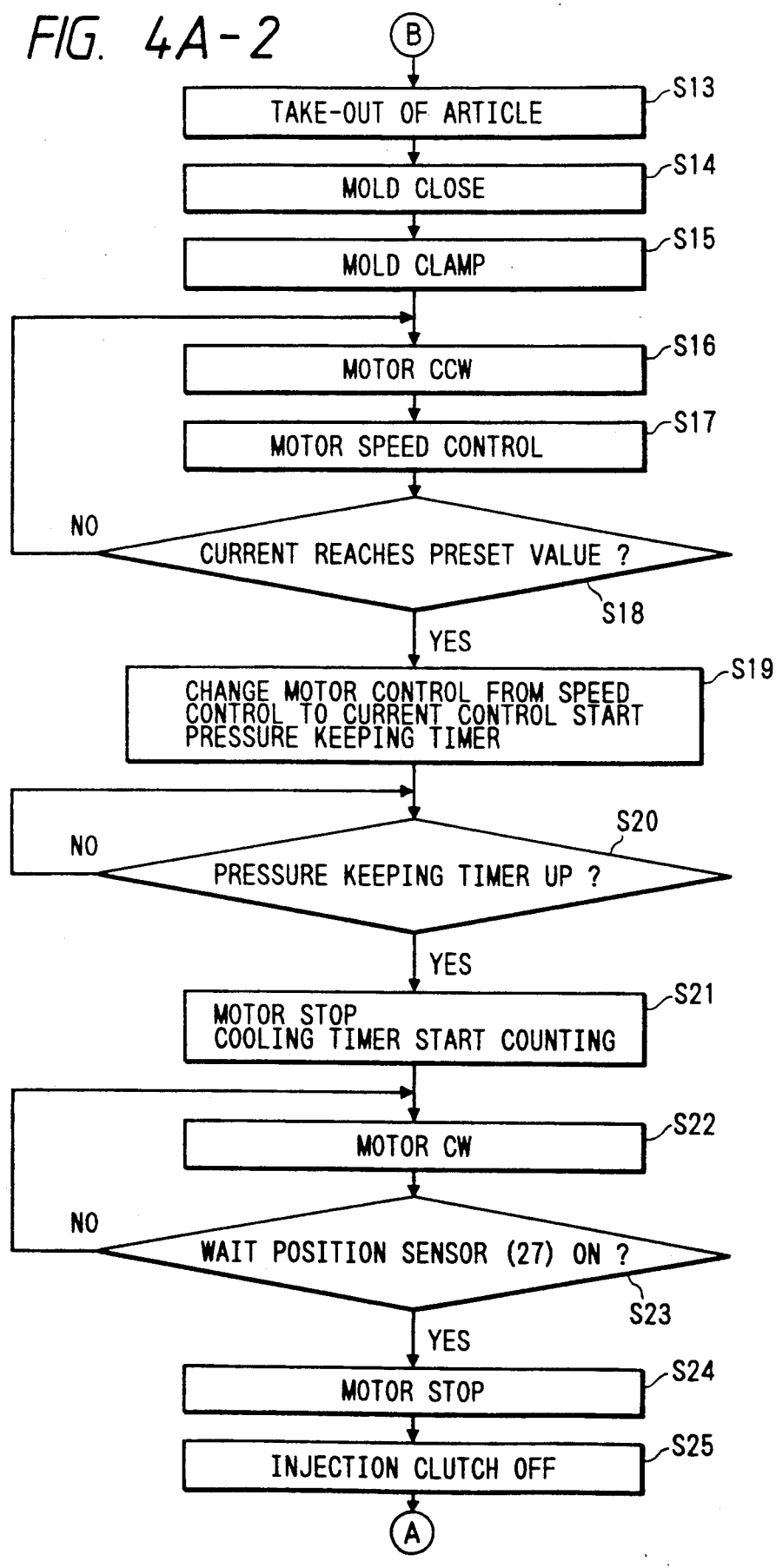
Figure 4B:
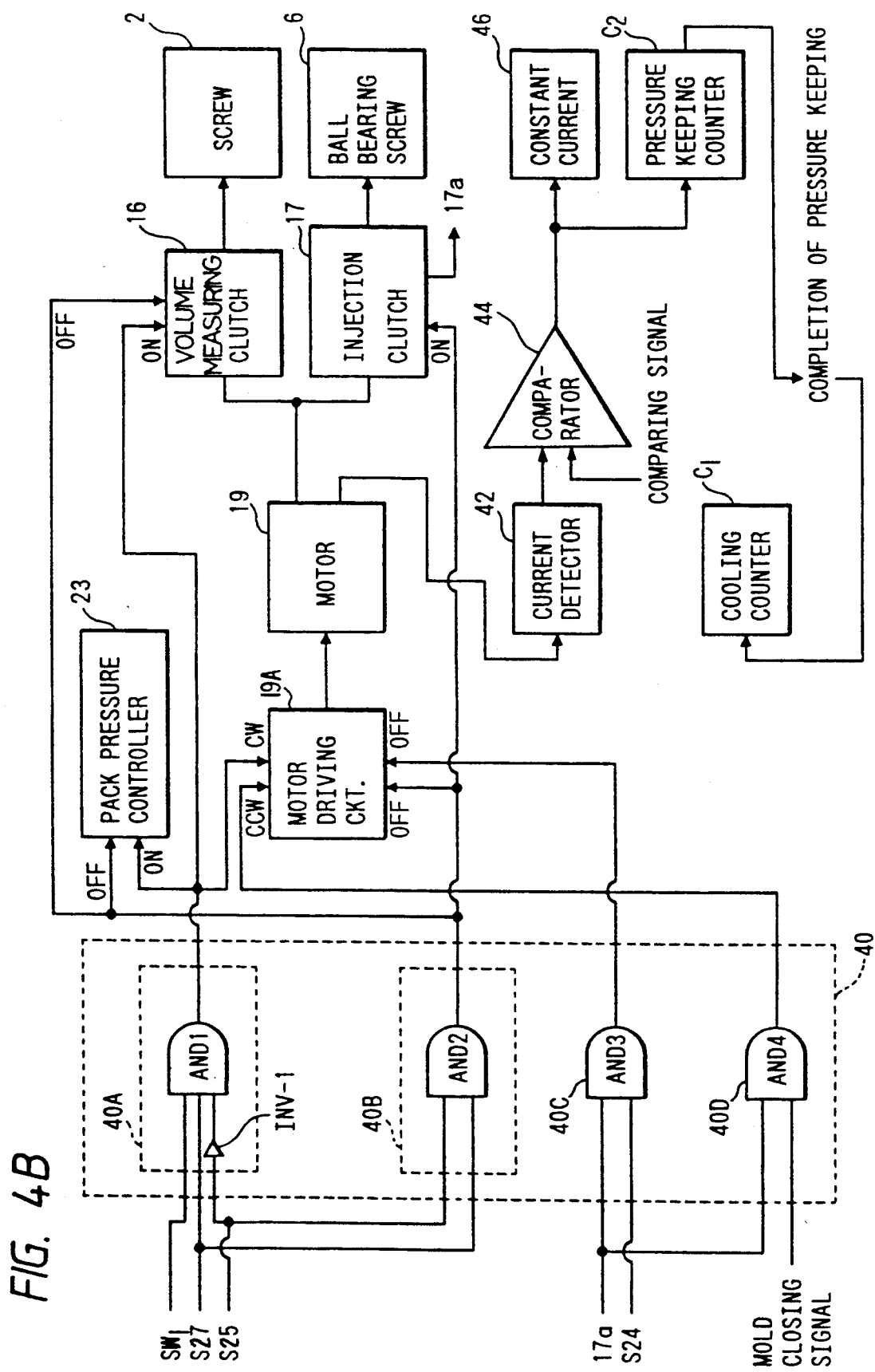
Figure 5:
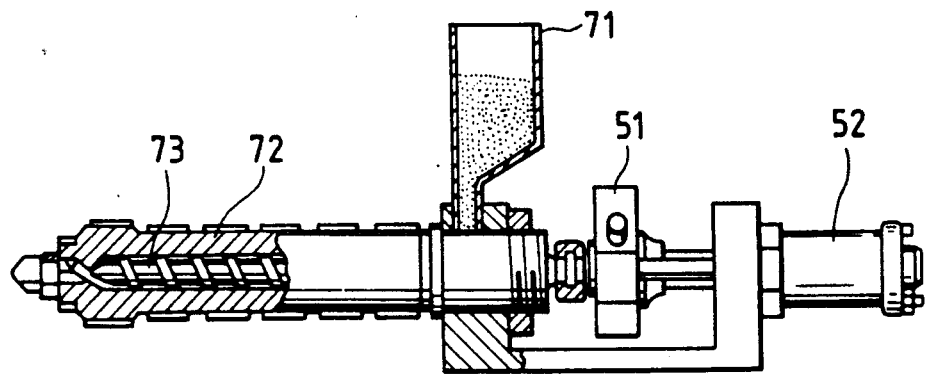
FIG. 5 is a schematic view of a hydraulic injection molding apparatus of conventional structure.
Figure 6:
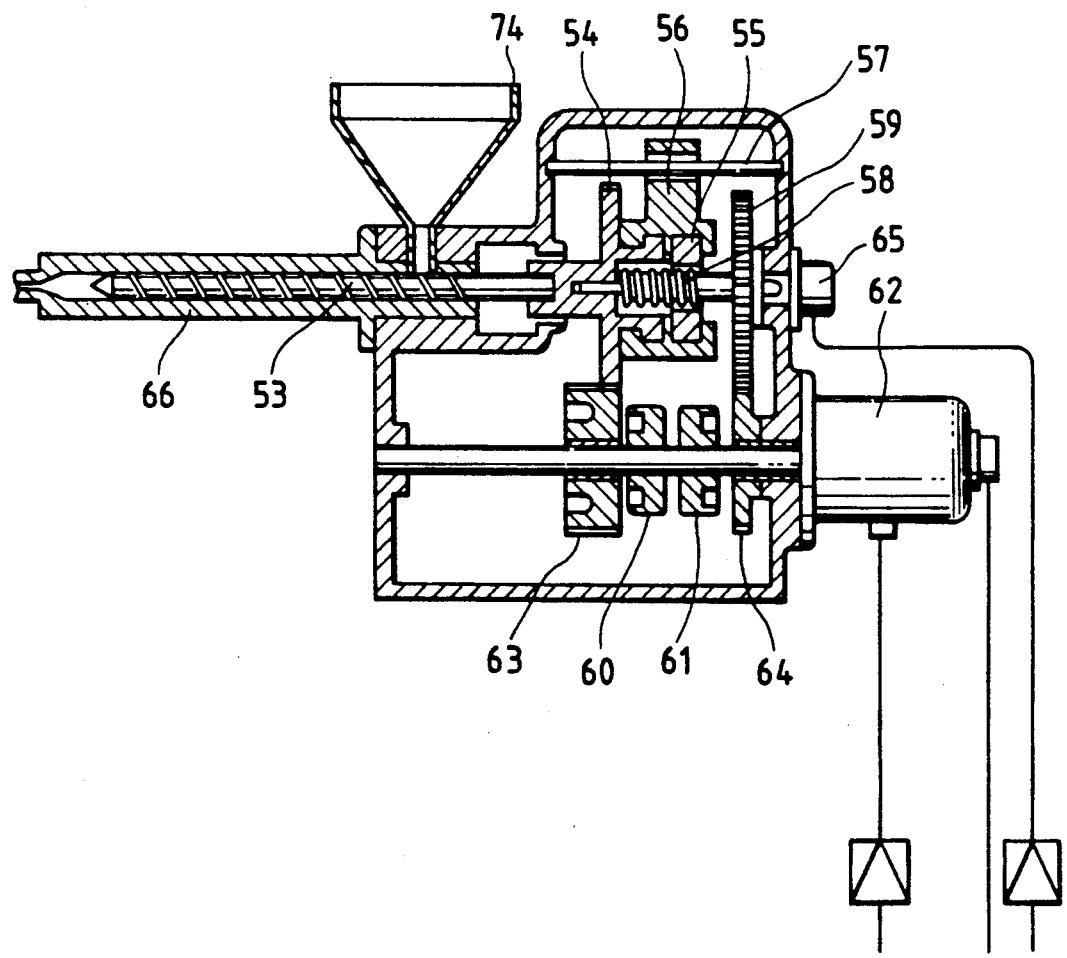
FIG. 6 is a schematic view of an electric injection molding apparatus of conventional structure.

FIG. 1A is a schematic cross-sectional view of an electric injection molding apparatus of the present embodiment, FIG. 1B is a cross-sectional view along a line II—II in FIG. 1A, FIG. 1C is a cross-sectional view along a line III—III in FIG. 1A, FIG. 2 is a perspective view of a rotating mechanism, a linear moving mechanism, a back pressurizing mechanism, a clutch, a motor etc. shown in FIG. 1, FIGS. 3A to 3E are schematic views showing the function of the present embodiment, and FIGS. 4A and 4B are respectively a flow chart and a block diagram for the control sequence for injection molding with the apparatus of the present embodiment.

As shown in FIGS. 1A and 2, the electric injection molding apparatus of the present embodiment is provided with a screw 2 housed in a heating cylinder 1; a spline shaft 3 fixed to said screw 2 by a pin 4; a guide shaft 5 for the hollow ball bearing screw, connected to the upper end of said spline shaft 3 by means for example of an unrepresented bolt and provided with a stopper plate 7 at the upper end; a hollow ball bearing screw 6 slidably fitted on the guide shaft 5; and a cylinder rod 33 impinging on the stopper plate 7 at the upper end of the guide shaft 5 through a thrust bearing 35, all aligned in a linear vertical arrangement.

A hopper 29 for feeding the molding material through a pipe 28 is connected to the heating cylinder 1.

An electric motor 19 positioned parallel to the foregoing components and controlled by a controller 30 is fixed on an injection unit base 21 supporting said heating cylinder 1. An input shaft 18 is connected to said motor 19 through a joint sleeve 20, and is provided with two clutches 16, 17 (measuring-blending clutch 16 and injection clutch 17). The measuring-blending clutch 16 can be connected to an input timing pulley 14, which is coupled, through a timing belt 12, with an output timing pulley 10 fixed on the outer periphery of a spline nut 8 fitted on said spline shaft 3. Thus, when the clutch 16 is connected to said pulley 14, the motor 19 rotates the spline shaft 3 and the screw 2, through the pulley 14, timing belt 12, timing pulley 10 and spline nut 8. The clutch 17 is connectable to an input timing pulley 15, which is coupled, through a timing belt 13, with an output timing pulley 11 fixed on the hollow ball bearing screw 6. Thus, when the clutch 17 is connected to the pulley 15, the motor 19 rotates the ball nut 9 through the pulley 15, timing belt 13, and timing pulley 11, thereby vertically moving the hollow ball bearing screw 6.

As shown in a cross-sectional view in FIG. 1B, said screw 6 is provided with a protruding piece 31, of which a front end fork engages with a guide rod 132 fixed to the injection unit base 21, whereby the screw 6 is not rotated by the rotation of the ball nut 9 but lineally moves along the guide shaft 5.

The hollow ball bearing screw 6 is slidably fitted on the guide shaft 5 and vertically moves by the rotation of the ball nut 9 as explained above. However, since the guide shaft 5 is provided at the upper end thereof with the stopper plate 7 larger than said screw 6, and at the lower end thereof connected to the spline shaft 3 which is larger in diameter than said screw 6, said screw in its vertical movement impinges on said stopper plate 7 at the upper end or the spline shaft 3 at the lower end. Since the stopper plate 7, guide shaft 5, spline shaft 3 and screw 2 are integrally constructed as explained above, the screw 2 can be vertically displaced in the heating cylinder 1 by the rotation of the ball nut 9, when the hollow ball bearing screw 6 is pressed to the upper stopper plate 7 or the lower spline shaft 3.

A back pressure cylinder 22 is mounted on the unillustrated portion of the injection unit base 21, in linear alignment with the stopper plate 7, guide shaft 5, spline shaft 3 and screw 2, and causes vertical movement of the cylinder rod 33, whereby a back pressure can be applied onto the screw 2 by lowering the cylinder rod 33 and pressing the stopper plate 7. A back pressure controller 23 is connected to said cylinder 22 and an unrepresented supply source for compressed fluid (such as air), through tubes 34. The pressure of the cylinder 22 is controlled by the pressure control of said compressed fluid in the pressure controller 23.

Such back pressurizing mechanism provides the screw 2 with a propelling force, against a pressure in the molten molding material accumulated in front of the screw as the result of measuring and blending of said molding material, thereby preventing the generation of bubbles in the molten molding material, encountered in the absence of such back pressure. The back pressurizing mechanism of the present embodiment, utilizing the pushing out operation of the cylinder 22, is simple in structure, allows easy adjustment and only requires a simple controller.

The thrust bearing 35, provided at the lower end of the cylinder rod 33 and impinging on the stopper plate 7, is composed, as shown in FIG. 1C, of two angular bearings 36, 37 which are symmetrically positioned and of which inner races are fixed on a shouldered portion of the cylinder rod 33 by a nut 38 screwed onto the end of said rod 33 while the outer races are fixed between a cylindrical member 40 having a shouldered portion 39 and another cylindrical member 42 having a projecting portion 41. Thus, when the cylinder rod 33 is in contact with the stopper plate 7, the cylindrical members 40, 42 are rotated but the cylinder rod 33 does not rotate because of the presence of the bearings 36, 37. For detecting the stroke of the screw 2 or the hollow ball bearing screw 6, there are provided sensors 24, 25, 26 and 27 (suction completion sensor 24; measuring-blending sensor 25; screw over-run sensor 26; and ball bearing screw stand-by position sensor 27). The sensors are so mounted on the injection unit base 21 as to be suitably adjustable.

The sensors in the present embodiment are composed of reflective photoelectric sensors. The suction completion sensor and the measurement completion sensor utilize the lateral face of the stopper plate 7 for detection, while the screw stand-by position sensor utilizes the lateral face of the screw 6 for detection, and each sensor is activated when said stopper plate or screw moves to a position receiving the light from said sensor. Also the over-run sensor utilizes the lateral face of said screw 6 for detection, and is activated when said screw moves to a position not receiving the light from said sensor.

Though not shown in FIG. 1A, a mold is positioned below the heating cylinder 1 at the injection molding operation, and there are also provided devices for opening and closing said mold and for tightening said mold.

Also in the present embodiment, the controller 30 is provided therein with a pressure holding timer and a cooling timer, for measuring the pressure-holding time and cooling time of the molded article in the cavity of the mold.

In the following there will be explained the function of the electric injection molding apparatus of the present embodiment, with reference to schematic views in FIGS. 3A-3E, a flow chart in FIGS. 4A-1 and 4A-2 and a block diagram in FIG. 4B. The following numbers preceded by S indicate the steps in said flow chart.

i) Measuring-blending mode

In a state shown in FIG. 3A, the hollow ball bearing screw 6 is in a position activating the standby position sensor 27, and the back pressure cylinder 22 and the measuring clutch 16 are also activated (step S1). An output signal of first logic means 40A is supplied to motor driving circuit 19A for the motor 19, whereby said motor 19 rotates clockwise (step S2).

The first logic means 40A is composed of an AND gate 1 receiving signals from the measuring-blending sensor 25, stand-by position sensor 27 and an operation switch SW1 indicating the active state of the present apparatus, and an inverter INV-1 for inverting the signal from said measuring-blending sensor 25.

Thus, in the state shown in FIG. 3A, in which the screw stand-by position sensor 27 is on, measuring-blending sensor 25 is off and switch SW1 is on, said logic means 40A sends a signal to the motor driving circuit 19A to rotate the motor 19 clockwise, and the measuring-blending clutch 16 is simultaneously turned on to transmit the rotation of said motor 19 through the belt 12 to the spline shaft 3. Also the output signal of the first logic means activates the pressure controller 23. Thus the motor 19 rotates clockwise (step S2), whereby the screw 2 is rotated through the timing belt 12, spline nut 8 and spline shaft 3 and rises in the heating cylinder 1, measuring and blending the molding material supplied into said cylinder 1. At the same time a back pressure is applied to the screw 2 by the back pressure cylinder 22 through the stopper plate 7, guide shaft 5 and spline shaft 3.

ii) Measuring-blending completion mode

When the screw 2 rises to a position shown in FIG. 3B, the measurement completion sensor 25 is activated (step S3).

The signal from said measurement completion sensor 25 and the signal from the screw stand-by position sensor 27, generated by the ascent of the screw 2, are supplied to second logic means 40B, which interrupts the power supply to the motor driving circuit 19A, thereby stopping the motor 19 (step S4).

The signal from the second logic means 40B also turns off the measuring clutch 16 and the pressure controller 23, thus disconnecting said clutch and releasing the back pressure. In this manner the measuring-blending mode is terminated (step S5).

In the course of measurement and blending of the molding material in the cylinder 1 as explained above, the material already measured and blended in the preceding cycle and injected into the unrepresented mold positioned below said cylinder 1 is cooled and removed from the mold. In this state, a suction operation is required in order to prevent leakage of the blended material from the injection outlet of the cylinder 1.

iii) Suction mode

After the motor 19 is stopped and the back pressure is released in the aforementioned step S5, the injection clutch 17 is activated by an output signal from the second logic means 40B, thereby connecting the motor 19 with the ball nut 9 and the ball bearing screw 6 (step S6).

A signal 17a indicating the activated state of the injection clutch 17 is released, and, in response, the motor drive means 19A releases a signal for rotating the motor 19 clockwise (step S7). Thus the hollow ball bearing screw 6 is elevated by the timing belt 13 and the ball nut 9 to push up the stopper plate 7, thereby effecting a suction operation. The suction operation is continued until the screw 6 rises to a position for turning on the suction completion sensor 24 as shown in FIG. 3C (step S8). The turn-on signal of said suction completion sensor 24 and the signal 17a indicating the activated state of the injection clutch 17 are supplied to third logic means 40C, which, in response, supplies the motor drive means 19A with a signal for stopping the motor 19, whereby the motor 19 is stopped (step S9) and the suction operation is completed. In FIG. 3C, "a" indicates the suction stroke, and "b" indicates the stroke of the hollow ball bearing screw in the suction operation.

After completion of the suction operation, the counting operation of the cooling counter C1 is completed (step S10). A corresponding signal C1 releases unrepresented mold tightening means thereby releasing the mold (step S11). Then the mold is opened (step S12) and the molded product is taken out (step S13). Subsequently the mold is closed again (step S14), and is tightened (step S15).

iv) Injection mode

The blended molding material is injected into the tightened mold. The injecting operation is conducted by the downward movement of the hollow ball bearing screw 6 caused by the rotation of the motor 19 through the linear driving force receiving means. More specifically, a mold tightening signal from the unrepresented mold tightening means and the activated state signal 17a of the injection clutch 17 are supplied to fourth logic means 40D, which in response releases a signal for rotating the motor 19 anticlockwise (step S16). Since the injection clutch 17 is still activated, the anticlockwise rotation of the motor 19 provides the screw 6 with a downward propelling force. The hollow ball bearing screw 6 is at first moved alone downward, and, after impinging on the shoulder 3a of the spline shaft, pushes the screw 2 downwards, thereby effecting injection into the mold. As the back pressure cylinder 22 is in the off position, the cylinder rod 33 remains in a position shown in FIG. 3C. In the injecting operation, the motor 19 is controlled by the controller 30, and, upon detection of a change in the current consumed in the motor 19 at the completion of injection (step S18), the motor control is switched from the speed control (step S17) to the current control (step S19), whereby the process proceeds from the injecting step to a pressure holding step for applying a predetermined pressure to the molding material. The injection is conducted at a constant speed, by maintaining the motor 19 at a constant revolution and thus obtaining a constant speed of descent of the hollow ball bearing screw 6. However, in such injecting operation, as the pressure of the molding material increases with the progress of filling thereof into the cavity of the mold, the current supplied to the motor 19 has to be increased progressively in order to maintain a constant injecting speed. Thus, for determining a fixed current, there is provided detecting means 42 for detecting the current in an unrepresented coil of the motor 19, and a signal from said detection means 42 is supplied to a comparator means 44 for comparison with a fixed reference value.

v) Pressure holding operation

The injecting operation is completed when the consumed current reaches said reference value. The output signal of said comparator means 44 is supplied to a constant current circuit 46, which maintains a constant current supply to the motor drive circuit 23, thereby applying a constant pressure to the molding material in the mold. The output signal from the comparator means 44 also initiates the counting operation of a pressure holding counter C2 for controlling the pressure holding time (step S19).

FIG. 3D indicates a state of completed injection, wherein "c" indicates the stroke of the hollow ball bearing screw, and "d" indicates the injecting stroke. In the normal state, the injection is completed with the hollow ball bearing screw 6 being positioned above the screw over-run sensor 26.

When the counting operation of the pressure holding timer is terminated (step S20), the motor 19 is stopped to terminate the pressure holding operation, and the counting operation of the cooling timer is initiated (step S21).

When the pressure holding operation is completed as explained above, the motor 19 is rotated clockwise while the injection clutch 17 is turned on, in order to prepare for the next measuring and blending operation (step S22). Thus the hollow ball bearing screw 6 is lifted until the screw stand-by position sensor 27 step S23), whereby the motor 19 is stopped in this state (step S24) to maintain the screw 6 in the position shown in FIG. 3E. At the same time the injection clutch 17 is turned off (step S25). In FIG. 3E, "e" indicates the stroke of the hollow ball bearing screw.

After the above-explained steps, the measuring clutch 16 and the back pressure cylinder are activated (step S1), thereby starting again the cycle of measuring and blending of the molding material, back pressuring, suction and injection explained above.

As explained above, in the present invention, the hollow ball bearing screw 6 is lifted to and maintained at the measuring stand-by position, and the measuring and blending operation is conducted in the disconnected state of the injection clutch 17, namely a state in which the hollow ball bearing screw 6 is completely disconnected from the propelling motor 19. Thus, in said measuring and blending operation, the screw 2 is solely given the rotary driving force, and is completely separated from the linear driving system (motor 19, ball bearing screw 6, nut 9 etc.). Consequently, in the vertical direction, the screw 2 only receives an upward propelling force resulting from the measurement of the molding material, and is lifted upwards with the progress of the measuring operation. In order to prevent the fluctuation in the measurement, the back pressure given to the screw 2 is solely determined by the output of the back pressure cylinder 22, and the amount of measured molding material is determined by the stroke of the screw detected by the measurement completion sensor 25.

In the present embodiment, the sensors 24, 25, 26, 27 are composed of photoelectric sensors, but they may also be composed for example of microswitches actuated for example by the end of the stopper plate 7.

The electric injection molding apparatus in which the present invention is applicable is subject to various modifications.

In the above-explained embodiment, the screw 2 is connected to the spline shaft 3 which is in turn connected to the guide shaft 5, but it is also possible to connect the guide shaft to the screw and to connect the spline shaft to said guide shaft. In such case, the back pressure cylinder presses the rear end of the spline shaft. Also in the above-explained embodiment, the guide shaft 5 is made smaller in diameter than the spline shaft 3 and the boundary between said shaft is used as the lower stopper for the hollow ball bearing screw 6, but, if the guide shaft 5 is larger in diameter than the spline shaft 3, a flange larger than said screw may be provided at the boundary of said shafts as the stopper for said screw.

Also in the above-explained embodiment, the spline shaft is used as the rotary shaft of the rotating mechanism, and the transmission mechanism for the rotary driving force is composed of the timing pulley 14, timing belt 12, timing pulley 10 and spline nut 8, but it is also possible to transmit the rotary driving force by forming the rotary shaft as a wide gear slidably meshing with a gear mounted in the input shaft 18.

Also in the linear driving mechanism, the timing belt 13 may be replaced by a gear mounted on the ball nut 9 and meshing with a gear mounted on the input shaft 18.

Furthermore, in the above-explained embodiment, the rotating mechanism and the linear driving mechanism are driven by a single motor 19 through two clutches 16, 17 but there may be employed two electric motors without clutches respectively for said mechanisms.

Furthermore, the foregoing embodiment is limited to a vertical molding apparatus, but the present invention is easily applicable also to a horizontal molding apparatus.

As explained in the foregoing, since the measuring operation is conducted in a state in which the rotary driving system for the screw is completely disconnected, by suitable switching means such as clutches, from the linear driving force for the screw, the back pressure given to the screw can be solely determined by the output of the back pressurizing means, and the functions of the driving systems can be precisely controlled by said switching means.

Also the measuring operation can be controlled easily, without complex condition setting in the prior art, for example by the pressure control of the compressed fluid supplied to the cylinder constituting the back pressurizing means.

Also in the present invention, since the rotary driving force receiving means and the linear driving force receiving means are coaxially connected to the screw, the stroke of said screw at the measuring operation can be determined from the stroke of said linear driving means, so that the detection means for measuring operation can be easily set and the completion of measuring operation can be precisely detected.

Also in the present invention, the stroke of the screw at the suction operation can be precisely detected from the stroke of the linear driving force receiving means present on the axis of said screw.

It is therefore possible to effect a precise suction operation by the control of screw stroke, through the use of suitable detector on the linear driving means for the screw for detecting the start and end points of movement of the screw, and the position adjustment of said detector.

What is claimed is:

1. An electric injection molding apparatus, comprising:
    a screw for injecting molding material;
    a heating cylinder for housing said screw and receiving the molding material;
    a motor for imparting rotational and linear movement to said screw;
    rotary transmitting means driven by said motor for transmitting rotational movement to said screw;
    linear transmitting means driven by said motor for transmitting linear movement to said screw;
    a first clutch for connecting and disconnecting said rotary transmitting means to said motor;
    a second clutch for connecting and disconnecting said linear transmitting means to said motor;
    means for measuring the amount of molding material deposited in said heating cylinder, said measuring means including a first detector for detecting a starting position of said linear transmitting means and a second detector for detecting a predetermined position of said linear transmitting means, with the predetermined position indicating completion of the measurement; and
    first control means for controlling said measuring means by actuating said first clutch to connect said rotary transmitting means with said motor to lift said linear transmitting means from the starting position to the predetermined position.

2. An apparatus according to claim 1, further comprising second control means for controlling movement of said linear transmitting means by disconnecting said first clutch and connecting said second clutch based on detection by said second detector and for reversing rotation of said motor to elevate said screw and create a suction force.

* * * * *

UNITED STATES PATENT AND TRADEMARK OFFICE
CERTIFICATE OF CORRECTION

PATENT NO. : 5,092,753
DATED : March 3, 1992
INVENTOR(S) : Masaaki Kumamura, et al.

It is certified that error appears in the above-identified patent and that said Letters Patent is hereby corrected as shown below:

On the title page: Item

[30] FOREIGN APPLICATION PRIORITY DATA:

Insert --March 28, 1990  [JP]  Japan .......... 2-82340--.

COLUMN 4:

Line 43, "rod 132" should read --rod 32--.
Line 45, "linealy" should read --linearly--.

COLUMN 7:

Line 61, "circuit 23," should read --circuit 19A--.

COLUMN 8:

Line 15, "step" should read --is activated (step--.
Line 17, "screw" should read --hollow ball bearing screw--.
Line 46, "measurement com-" should read --measurement-blending--.
Line 47, "pletion" should be deleted.

Signed and Sealed this

Fifth Day of October, 1993

Attest:

BRUCE LEHMAN

*Attesting Officer*   *Commissioner of Patents and Trademarks*